(12) United States Patent
Fadeev (10) Patent No.: US 10,752,790 B2
(45) Date of Patent: Aug. 25, 2020

(54) UV BLOCKING COATINGS FOR LENS ASSEMBLIES

(71) Applicant: Corning Incorporated, Corning, NY (US)

(72) Inventor: Andrei Gennadyevich Fadeev, Elmira, NY (US)

(73) Assignee: Corning Incorporated, Corning, NY (US)

( * ) Notice: Subject to any disclaimer, the term of this patent is extended or adjusted under 35 U.S.C. 154(b) by 266 days.

(21) Appl. No.: 15/834,802

(22) Filed: Dec. 7, 2017

(65) Prior Publication Data

US 2018/0171162 A1    Jun. 21, 2018

Related U.S. Application Data

(60) Provisional application No. 62/437,414, filed on Dec. 21, 2016.

(51) Int. Cl.
  *C09D 5/32* (2006.01)
  *G02B 5/20* (2006.01)
  (Continued)

(52) U.S. Cl.
  CPC .............. *C09D 5/32* (2013.01); *C09D 5/00* (2013.01); *C09D 7/67* (2018.01); *C09D 183/08* (2013.01);
  (Continued)

(58) Field of Classification Search
  None
  See application file for complete search history.

(56) References Cited

U.S. PATENT DOCUMENTS

| 5,618,626 A | 4/1997 | Nagashima et al. |
| 6,097,536 A | 8/2000 | Bauer et al. |

(Continued)

FOREIGN PATENT DOCUMENTS

| EP | 1574491 A1 | 9/2005 |
| JP | 2001123116 A | 5/2001 |

(Continued)

OTHER PUBLICATIONS

Kaneko et al; "Sol-Gel Preparation of Highly Water-Dispersible Silsesquioxane/Zirconium Oxide Hybrid Nanopartticles"; International Journal of Polymer Science, vol. 2012, Article ID 984501; (2012), pp. 1-6.

(Continued)

*Primary Examiner* — Collin X Beatty
(74) *Attorney, Agent, or Firm* — Amy T. Lang (57) ABSTRACT

An aqueous formulation and method of making an ultraviolet light blocking coating from an aqueous formulation having from greater than or equal to 15 wt % to less than or equal to 65 wt % water, from greater than or equal to 30 wt % to less than or equal to 70 wt % metal oxide particles, and from greater than or equal to 5 wt % to less than or equal to 35 wt % aminoalkylsilsesquioxane oligomers. An optical device including a housing, a lens element, potting material positioned between the lens element and the housing, and an ultraviolet light blocking coating positioned between the lens element and the potting material. The ultraviolet light blocking coating has from greater than or equal to 30 wt % to less than or equal to 90 wt % metal oxide particles and from greater than or equal to 10 wt % to less than or equal to 70 wt % silsesquioxane.

20 Claims, 10 Drawing Sheets

(51) Int. Cl.
*G02B 1/04* (2006.01)
*G02B 1/10* (2015.01)
*C09D 7/40* (2018.01)
*C09D 183/08* (2006.01)
*C09D 5/00* (2006.01)
*C08K 3/22* (2006.01)

(52) U.S. Cl.
CPC .............. *G02B 1/04* (2013.01); *G02B 1/10* (2013.01); *G02B 5/208* (2013.01); *C08K 3/22* (2013.01); *C08K 2003/2213* (2013.01); *C08K 2003/2244* (2013.01); *C08K 2003/2248* (2013.01); *C08K 2003/2262* (2013.01); *C08K 2003/2272* (2013.01); *C08K 2003/2293* (2013.01); *C08K 2201/005* (2013.01)

(56) References Cited

U.S. PATENT DOCUMENTS

| | | | |
|---|---|---|---|
| 7,081,278 B2 | 7/2006 | Lipson et al. | |
| 7,232,595 B2 | 6/2007 | Coykendall et al. | |
| 8,335,045 B2 | 12/2012 | Schreiber et al. | |
| 8,932,737 B2 | 1/2015 | Bowen et al. | |
| 2004/0179800 A1 | 9/2004 | Walker, Jr. et al. | |
| 2006/0083870 A1 | 4/2006 | Chen | |
| 2008/0015298 A1 | 1/2008 | Xiong et al. | |
| 2010/0249265 A1* | 9/2010 | Engardio | G02B 1/105 523/107 |
| 2015/0277002 A1* | 10/2015 | Ezoe | B32B 27/20 348/294 |
| 2015/0316742 A1* | 11/2015 | Jono | A61B 1/00096 348/76 |
| 2015/0329679 A1 | 11/2015 | Yoshida et al. | |
| 2016/0197122 A1* | 7/2016 | Ryuichi | H01L 27/307 257/40 |

FOREIGN PATENT DOCUMENTS

JP 2007009079 A 1/2007
WO 2014098167 A1 6/2014

OTHER PUBLICATIONS

International Search Report and Written Opinion PCT/US2017/065525 dated Mar. 12, 2018.

\* cited by examiner

FIG. 11D ly relates to UV blocking coatings and, more specifically, to UV blocking coatings that can be easily applied to lens elements in lens assemblies.
UV BLOCKING COATINGS FOR LENS ASSEMBLIES This application claims the benefit of priority under 35 U.S.C. § 119 of U.S. Provisional Application Ser. No. 62/437,414, filed on Dec. 21, 2016, the content of which is relied upon and incorporated herein by reference in its entirety.

BACKGROUND

Field

The present specification generally relates to UV blocking coatings and, more specifically, to UV blocking coatings that can be easily applied to lens elements in lens assemblies.

Technical Background

There are a number of applications where it is necessary to bond materials together using adhesives and it is undesirable for the adhesive to give off any volatile organic materials after curing. The process of evolving volatile organic materials after curing is often called outgassing or offgassing. Outgassed compounds can condense on optical surfaces and negatively affect the transmission of light.

For many adhesive or lens potting applications, it is necessary to bond together materials (substrates) of different coefficients of thermal expansion. In these applications, the adhesive or potting material must allow for the expansion and contraction of the two different substrates as the temperature changes yet still maintain the adhesion of the two substrates together. This requires the use of a soft, low modulus, low $T_g$ rubbery type material. The ability to formulate materials that cure to soft, compliant, rubber-like solids and yet still have low outgassing after cure is very difficult. This is especially true if the cured material also has to have excellent thermal, oxidative, and hydrolytic stability.

Materials that meet the above criteria for potting materials have a tendency to degrade over time. In particular, potting materials are generally formed from polymers, and it has been noticed that over time the polymeric bonding in the potting materials break down and form oligomers, which do not have the beneficial properties of the polymeric potting materials. This breakdown of polymeric potting materials is pronounced in lens assemblies, and in particular in lens assemblies in lithographic devices.

Accordingly, a need exists for materials that prevent the breakdown of polymeric potting materials. In particular, a need exists for materials that prevent the breakdown of polymeric potting materials that can be easily applied to lens elements, such as lens assemblies in lithographic devices.

SUMMARY

According to one embodiment, an aqueous formulation of an ultraviolet light blocking coating comprises: from greater than or equal to 15 wt % to less than or equal to 65 wt % water; from greater than or equal to 30 wt % to less than or equal to 70 wt % metal oxide particles; and from greater than or equal to 5 wt % to less than or equal to 35 wt % aminoalkylsilsesquioxane oligomers.

In another embodiment, a method for preparing an ultraviolet light blocking coating, comprises: forming an aqueous formulation by mixing: from greater than or equal to 15 wt % to less than or equal to 65 wt % of water, greater than or equal to 30 wt % to less than or equal to 70 wt % metal oxide particles, and greater than or equal to 5 wt % to less than or equal to 35 wt % aminoalkylsilsesquioxane oligomers. The aqueous formulation is applied to a substrate, and the aqueous formulation that has been applied to the substrate is cured.

In yet another embodiment, an optical device comprises: a housing; at least one lens element positioned within the housing; potting material positioned between at least a portion of the at least one lens element and the housing; and an ultraviolet light blocking coating positioned between the at least one lens element and the potting material. The ultraviolet light blocking coating comprises from greater than or equal to 30 wt % to less than or equal to 90 wt % metal oxide particles and from greater than or equal to 10 wt % to less than or equal to 70 wt % silsesquioxane.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of UV blocking coatings, methods of applying UV blocking coatings, and devices comprises UV blocking coatings, embodiments of which are illustrated in the accompanying drawings. Whenever possible, the same reference numerals will be used throughout the drawings to refer to the same or like parts.

As noted above, an issue with potting materials used in lens assemblies is the degradation of the potting material over time. It is believed that the polymeric potting material may be susceptible to degradation upon exposure to short-wavelength energy, such as UV light. In particular, many of the materials that meet the criteria for potting materials are polymers, and continued exposure to short-wavelength energy, such as UV light, can cause bonds in these polymers to break down, which forms oligomers over time. For instance, the material gradually degrades under normal operating conditions when lens assembly is used in lithography process. The degradation is believed to be caused by UV light scattered in the lens element.

To address this degradation caused by UV light, embodiments disclosed herein provide UV blocking coatings that can be easily applied in a lens assembly, such as applied between the lens element and the potting material to block UV light generated in the lens assembly from reaching the potting material. To meet this objective, the composition of UV blocking coatings disclosed herein is carefully determined and balanced with the above objectives in mind. For instance, the energy of photons at wavelengths within the UV bandwidth, such as wavelengths less than or equal to 266 nm, is 4.66 eV. However, the energy of a C—C bond is from 3.60 eV to 3.69 eV. Thus, any organic-based coatings exposed to such short-wavelength energy will degrade. Therefore, in embodiments, the coating material may be inorganic in nature. Additionally, in some embodiments, the coating material is capable of blocking UV light, rather than reflecting it, which reduces the UV light scatter in the lens assembly. In embodiments, metal oxides are added to an aqueous formulation to form a UV blocking coating that blocks UV light, which provides the benefits of a water-based coating formulation.

In addition to the above properties and makeup of the UV blocking coating, the precision required for coating deposition to the lens element and the cleanness of the lens surface should also be considered. In view of these aspects, embodiments of the UV blocking coating are formed using wet chemistry, which provides for application of the coating at atmospheric pressures and temperatures. In contrast, conventional UV blocking coatings could comprise metal oxide sol-gel materials, where the sol-gel is formed using moisture reactive metal oxide precursors and a series of complex hydrolysis and condensation reactions that are often difficult to control (Kaneko et al., 2012). The nature and reactivity of these conventional coatings makes them difficult to work with, as to fully convert metal oxide precursor into a low outgassing metal oxide high temperature, >300° C., is required. Not only exposure of sensitive optical components to high temperature without a contamination is less than trivial, a mismatch in thermal expansion of a coating and substrate could result in coating delamination and formation of cracks.

By using water based chemistry and metal oxides to block UV light, the UV blocking coating of embodiments may be easily and accurately applied to a lens element and between the lens elements and the potting material to protect the polymeric potting material from scattered UV light generated in the lens element.

In embodiments, the coating formulation comprises water and silsesquioxane oligomers containing aminoalkyl and silanol functionalities. In some embodiments, the coating formulation comprises alcohol, such as, for example, methanol, or water-alcohol mixtures, and silsesquioxane oligomers containing aminoalkyl and silanol functionalities. As used herein, aminoalkylsilsesquioxane and all subsets of aminoalkylsilsesquioxane described below refer to aminoalkylsilsesquioxane oligomers. Thus, as used herein "aminoalkylsilsesquioxane" and any subset of aminoalkylsilsesquioxane is synonymous with "aminoalkylsilsesquioxane oligomers". In some embodiments, the aminoalkylsilsesquioxane is selected from aminomethylsilsesquioxane, aminopropylsilsesquioxane, aminobutylsilsesquioxane, and combinations thereof. In embodiments, smaller aminoalkyl functional groups are used. In a cured coating, these smaller aminoalkyl functional groups still can undergo degradation under UV light or in the presence of strong oxidizing agents, for example ozone. Degradation of smaller groups will result in lower mass loss and, subsequently, less stress in the coating. Stress buildup in a coating could result in development of cracks and cause coating delamination. In addition to aminoalkyl functional groups the silsesquioxane could contain other organic groups, for example, methyl, vinyl, hydrido, epoxypropyl, methacryloxypropy and the like. The silanol groups could be partially or completely be replaced with hydrolysable groups such as alkoxy, acetoxy, or halogen. In still other embodiments, the aminoalkylsilsesquioxane is aminopropylsilsesquioxane. Aminoalkylsilsesquioxane can generally be well-dispersed in water and allows the UV blocking coating formulation to be an aqueous formulation that does not require the complexities of a sol-gel system, and the formulation does not require the use of an organic solvent. Without being bound to any particular theory, it is believed that the amino groups in the aminoalkylsilsesquioxane are ionized in water, which causes the aminoalkylsilsesquioxane to become positively charged. By having the similar (positive) charges, the individual aminoalkylsilsesquioxane repel one another allow for uniform dispersion in the aqueous formulation.

In embodiments, the aminoalkylsilsesquioxane comprises greater than or equal to 5 wt % to less than or equal to 35 wt % of the aqueous formulation, such as greater than or equal to 10 wt % to less than or equal to 35 wt % of the aqueous formulation, greater than or equal to 15 wt % to less than or equal to 35 wt % of the aqueous formulation, greater than or equal to 20 wt % to less than or equal to 35 wt % of the aqueous formulation, greater than or equal to 25 wt % to less than or equal to 35 wt % of the aqueous formulation, or greater than or equal to 30 wt % to less than or equal to 35 wt % of the aqueous formulation, and all ranges and sub-ranges between the foregoing values. In other embodiments, the aminoalkylsilsesquioxane comprises greater than or equal to 5 wt % to less than or equal to 30 wt % of the aqueous formulation, such as greater than or equal to 5 wt % to less than or equal to 25 wt % of the aqueous formulation, greater than or equal to 5 wt % to less than or equal to 20 wt % of the aqueous formulation, greater than or equal to 5 wt % to less than or equal to 15 wt % of the aqueous formulation, or greater than or equal to 5 wt % to less than or equal to 10 wt % of the aqueous formulation, and all ranges and sub-ranges between the foregoing values. Accordingly, in embodiments, the aqueous formulation may comprise from greater than or equal to 5 wt % to less than or equal to 35 wt % aminoalkylsilsesquioxane, such as greater than or equal to 10 wt % to less than or equal to 30 wt % aminoalkylsilsesquioxane, or greater than or equal to 15 wt % to less than or equal to 25 wt % aminoalkylsilsesquioxane, and all ranges and sub-ranges between the foregoing values.

In addition to the aminoalkylsilsesquioxane, embodiments of the aqueous UV blocking coating formulation also include one or more metal oxide particles that block UV light. The metal oxide particles may be selected from CuO, $Fe_2O_3$, $Mn_2O_3$, $CeO_2$, NiO, $ZrO_2$, $Nb_2O_5$, and combinations thereof. The metal oxide particles may be present as particles in the aqueous formulation disclosed above. In embodiments, the particles may have any size, as the desired UV blocking capability of the coating can be achieved with particles of many different sizes. However, the workability of the coating may be affected when the particle sizes become too large. Accordingly, in some embodiments, the metal oxides may be nanoparticles, such as particles having an average particle size from greater than or equal to 1.5 nm to less than or equal to 120 nm and all ranges and sub-ranges between the foregoing values. In embodiments, the metal oxides particles may have a particle size greater than or equal to 1.5 nm to less than or equal to 120 nm, greater than or equal to 5 nm to less than or equal to 120 nm, greater than or equal to 10 nm to less than or equal to 120 nm, greater than or equal to 15 nm to less than or equal to 120 nm, greater than or equal to 20 nm to less than or equal to 120 nm, greater than or equal to 25 nm to less than or equal to 120 nm, greater than or equal to 30 nm to less than or equal to 120 nm, greater than or equal to 35 nm to less than or equal to 120 nm, greater than or equal to 40 nm to less than or equal to 120 nm, greater than or equal to 45 nm to less than or equal to 120 nm, greater than or equal to 50 nm to less than or equal to 120 nm, greater than or equal to 55 nm to less than or equal to 120 nm, greater than or equal to 60 nm to less than or equal to 120 nm, greater than or equal to 65 nm to less than or equal to 120 nm, greater than or equal to 70 nm to less than or equal to 120 nm, greater than or equal to 75 nm to less than or equal to 120 nm, greater than or equal to 80 nm to less than or equal to 120 nm, greater than or equal to 85 nm to less than or equal to 120 nm, greater than or equal to 90 nm to less than or equal to 120 nm, or greater than or equal to 95 nm to less than or equal to 120 nm and all ranges and sub-ranges between the foregoing values. In other embodiments, the metal oxide particles may have a particle size from greater than or equal to 1.5 nm to less than or equal to 11.5 nm, greater than or equal to 1.5 nm to less than or equal to 110 nm, greater than or equal to 1.5 nm to less than or equal to 105 nm, greater than or equal to 1.5 nm to less than or equal to 100 nm, greater than or equal to 1.5 nm to less than or equal to 95 nm, greater than or equal to 1.5 nm to less than or equal to 90 nm, greater than or equal to 1.5 nm to less than or equal to 85 nm, greater than or equal to 1.5 nm to less than or equal to 80 nm, greater than or equal to 1.5 nm to less than or equal to 75 nm, greater than or equal to 1.5 nm to less than or equal to 70 nm, greater than or equal to 1.5 nm to less than or equal to 65 nm, greater than or equal to 1.5 nm to less than or equal to 60 nm, greater than or equal to 1.5 nm to less than or equal to 55 nm, greater than or equal to 1.5 nm to less than or equal to 50 nm, greater than or equal to 1.5 nm to less than or equal to 45 nm, greater than or equal to 1.5 nm to less than or equal to 40 nm, greater than or equal to 1.5 nm to less than or equal to 35 nm, greater than or equal to 1.5 nm to less than or equal to 30 nm, greater than or equal to 1.5 nm to less than or equal to 25 nm, greater than or equal to 1.5 nm to less than or equal to 20 nm and all ranges and sub-ranges between the foregoing values.

The metal oxide particles may be added, in embodiments, to the aqueous formulation in an amount such that the metal oxides comprise from greater than or equal to 30 wt % to less than or equal to 70 wt % of the aqueous formulation and all ranges and sub-ranges between the foregoing values. In some embodiments, the metal oxides comprise from greater than or equal to 35 wt % to less than or equal to 70 wt % of the aqueous formulation, greater than or equal to 40 wt % to less than or equal to 70 wt % of the aqueous formulation, greater than or equal to 45 wt % to less than or equal to 70 wt % of the aqueous formulation, greater than or equal to 50 wt % to less than or equal to 70 wt % of the aqueous formulation, greater than or equal to 55 wt % to less than or equal to 70 wt % of the aqueous formulation, greater than or equal to 60 wt % to less than or equal to 70 wt % of the aqueous formulation, or greater than or equal to 65 wt % to less than or equal to 70 wt % of the aqueous formulation, and all ranges and sub-ranges between the foregoing values. In other embodiments, the metal oxides comprise from greater than or equal to 30 wt % to less than or equal to 65 wt % of the aqueous formulation, greater than or equal to 30 wt % to less than or equal to 60 wt % of the aqueous formulation, greater than or equal to 30 wt % to less than or equal to 55 wt % of the aqueous formulation, greater than or equal to 30 wt % to less than or equal to 50 wt % of the aqueous formulation, greater than or equal to 30 wt % to less than or equal to 45 wt % of the aqueous formulation, greater than or equal to 30 wt % to less than or equal to 40 wt % of the aqueous formulation, or greater than or equal to 30 wt % to less than or equal to 35 wt % of the aqueous formulation, and all ranges and sub-ranges between the foregoing values.

The total weight percent of aminoalkylsilsesquioxane and metal oxide particles in the aqueous formulation should be less than 100 wt % so that water is present as a component of the aqueous formulation, and all ranges and sub-ranges between the foregoing values. In embodiments, water comprises from greater than or equal to 15 wt % to less than or equal to 65 wt % of the aqueous formulation. In some embodiments water comprises from greater than or equal to 20 wt % to less than or equal to 60 wt % of the aqueous formulation, greater than or equal to 25 wt % to less than or equal to 55 wt % of the aqueous formulation, greater than or equal to 30 wt % to less than or equal to 50 wt % of the aqueous formulation, or greater than or equal to 35 wt % to less than or equal to 45 wt % of the aqueous formulation, and all ranges and sub-ranges between the foregoing values.

The amounts of the one or more metal oxides, aminoalkylsilsesquioxane, and water may be balanced based upon the desired UV blocking and physical characteristics of the UV blocking coating. For instance, a higher amount of metal oxides will block more UV light, but if the amount of the one or more metal oxides is too high, it will become difficult to apply the UV blocking coating aqueous formulation to a substrate, such as a lens. Alternatively, if the amount of the one or more metal oxides is too low, the UV blocking coating will not sufficiently block UV light.

Different metal oxides have a propensity to block different wavelengths of light. Accordingly, specific metal oxides can be added to the aqueous formulation to yield a UV blocking coating that blocks specific wavelengths of light. For example, CuO generally blocks light with wavelengths below about 800 nm, $Fe_2O_3$ generally blocks light with wavelengths below about 560 nm, $Mn_2O_3$ generally blocks light with wavelengths below about 800 nm, $CeO_2$ generally blocks light with wavelengths below about 350 nm, NiO generally blocks light with wavelengths below about 800 nm, $ZrO_2$ generally blocks light with wavelengths below about 245 nm, and $Nb_2O_3$ generally blocks light with wavelengths below about 380 nm. Thus, in various embodiments, one or more of these metal oxide particles may be added to the aqueous formulation to selectively block certain wavelengths of light. As a non-limiting example, if one only wanted to block light with wavelengths below about 350 nm, $CeO_2$ could be added to the aqueous formulation.

Because different metal oxides block different wavelengths of light, as disclosed above, the UV blocking coating comprising the metal oxide particles may present a different color to the substrate to which it is applied. This coloring can be useful when applying the UV blocking coating to a substrate because it allows for a visual observance of the UV blocking coating application so that the location and quality of the UV blocking coating application can easily be determined. In embodiments, CuO generally presents a black color, $Fe_2O_3$ generally presents a red or orange color, $Mn_2O_3$ generally presents a black color, $CeO_2$ generally presents a yellow or translucent color, NiO generally presents a gray or black color, $ZrO_2$ generally presents a white color, and $Nb_2O_3$ generally presents a white color. Accordingly, in embodiments, specific metal oxide particles may be added to the aqueous formulation to formulate a UV blocking coating with a desired color.

Using aminoalkylsilsesquioxane in the UV blocking coating provides benefits that other components do not provide. For instance, upon curing, the aminoalkylsilsesquioxane forms a polymeric structure with Si—O—Si linkages. This allows the polymeric structure to covalently bond with a substrate, such as glass or high purity fused silica lens elements, which provides for a well-adhered coating. Hydroxyl functionalized silsesquioxanes interact/react with hydroxyl groups on the surface of metal oxide particles, thus facilitating an even distribution of commercially available metal oxide particles in the coating.

An additional advantage of the UV blocking coating of embodiments is the ease with which it can be applied to a substrate. One reason for this ease of application is that the UV blocking coating is initially formed as an aqueous formulation and does not include other liquids in the formulation, such as organic solvents, that need to be removed subsequent to application. That is to say that, in embodiments, the aqueous formulation of the UV blocking coating does not include components other than aminoalkylsilsesquioxane, metal oxide particles, and water. Or, put differently, the UV blocking coating of some embodiments consists of or, in alternative embodiments, consists essentially of aminoalkylsilsesquioxane, water, and one or more metal oxide.

Because of the above coating composition, the aqueous formulation of the UV blocking coating may be easily applied to a substrate at atmospheric temperature and pressure. For instance, the aqueous formulation of the UV blocking coating may be applied to a substrate by conventional coating methods including, but not limited to: physical deposition, such as, for example, spray, spin, or dip coating, brush/swab coating, printing. Other coating methods may also be used.

In addition to the above, because the UV blocking coating of embodiments initially is an aqueous formulation, the UV blocking coating can be cured on the substrate to which it is applied at atmospheric pressure and at relatively low temperatures. In embodiments, the aqueous formulation UV blocking coating may be cured at temperatures from greater than or equal to 100° C. to less than or equal to 150° C. and all ranges and sub-ranges between the foregoing values. In some embodiments, the aqueous formulation of the UV blocking coating may be cured at temperatures from greater than or equal to 105° C. to less than or equal to 150° C., greater than or equal to 110° C. to less than or equal to 150° C., greater than or equal to 115° C. to less than or equal to 150° C., greater than or equal to 120° C. to less than or equal to 150° C., greater than or equal to 125° C. to less than or equal to 150° C., greater than or equal to 130° C. to less than or equal to 150° C., greater than or equal to 135° C. to less than or equal to 150° C., greater than or equal to 140° C. to less than or equal to 150° C., or greater than or equal to 145° C. to less than or equal to 150° C. and all ranges and sub-ranges between the foregoing values. In other embodiments, the aqueous formulation of the UV blocking coating may be cured at temperatures from greater than or equal to 100° C. to less than or equal to 145° C., greater than or equal to 100° C. to less than or equal to 140° C., greater than or equal to 100° C. to less than or equal to 135° C., greater than or equal to 100° C. to less than or equal to 130° C., greater than or equal to 100° C. to less than or equal to 125° C., greater than or equal to 100° C. to less than or equal to 120° C., greater than or equal to 100° C. to less than or equal to 115° C., greater than or equal to 100° C. to less than or equal to 110° C., or greater than or equal to 100° C. to less than or equal to 105° C. and all ranges and sub-ranges between the foregoing values. The substrate and/or coating may be heated to the curing temperature by any suitable heating process, such as, for example, convection heating, conduction heating, and infrared heating. In some embodiments, the UV blocking coating is dried before it is cured.

Once cured, the UV blocking coating comprises only silsesquioxane and metal oxide particles. Upon curing, silsesquioxane forms a three dimensional —Si—O—Si— structure which is not prone to degradation by UV light. This resistance to degradation provides a distinct advantage over organic-based coatings, and provides adequate UV protection for potting materials in the lens assembly.

In embodiments, the silsesquioxane comprises greater than or equal to 10 wt % to less than or equal to 70 wt % of the UV blocking coating, such as greater than or equal to 15 wt % to less than or equal to 70 wt % of the UV blocking coating, greater than or equal to 20 wt % to less than or equal to 70 wt % of the UV blocking coating, greater than or equal to 25 wt % to less than or equal to 70 wt % of the UV blocking coating, greater than or equal to 30 wt % to less than or equal to 70 wt % of the UV blocking coating, greater than or equal to 35 wt % to less than or equal to 70 wt % of the UV blocking coating, greater than or equal to 40 wt % to less than or equal to 70 wt % of the UV blocking coating, greater than or equal to 45 wt % to less than or equal to 70 wt % of the UV blocking coating, greater than or equal to 50 wt % to less than or equal to 70 wt % of the UV blocking coating, greater than or equal to 55 wt % to less than or equal to 70 wt % of the UV blocking coating, greater than or equal to 60 wt % to less than or equal to 70 wt % of the UV blocking coating, greater than or equal to 65 wt % to less than or equal to 70 wt % of the UV blocking coating, and all ranges and sub-ranges between the foregoing values. In other embodiments, the aminoalkylsilsesquioxane comprises greater than or equal to 10 wt % to less than or equal to 65 wt % of the UV blocking coating, such as greater than or equal to 10 wt % to less than or equal to 60 wt % of the UV blocking coating, greater than or equal to 10 wt % to less than or equal to 55 wt % of the UV blocking coating, greater than or equal to 10 wt % to less than or equal to 50 wt % of the UV blocking coating, greater than or equal to 10 wt % to less than or equal to 45 wt % of the UV blocking coating, greater than or equal to 10 wt % to less than or equal to 40 wt % of the UV blocking coating, greater than or equal to 10 wt % to less than or equal to 35 wt % of the UV blocking coating, greater than or equal to 10 wt % to less than or equal to 30 wt % of the UV blocking coating, greater than or equal to 10 wt % to less than or equal to 25 wt % of the UV blocking coating, greater than or equal to 10 wt % to less than or equal to 20 wt % of the UV blocking coating, or greater than or equal to 10 wt % to less than or equal to 15 wt % of the UV blocking coating, and all ranges and sub-ranges between the foregoing values. Accordingly, in embodiments, the UV blocking coating may comprise from greater than or equal to 10 wt % to less than or equal to 70 wt % silsesquioxane, such as greater than or equal to 15 wt % to less than or equal to 65 wt % silsesquioxane, greater than or equal to 20 wt % to less than or equal to 60 wt % silsesquioxane, greater than or equal to 25 wt % to less than or equal to 55 wt % silsesquioxane, greater than or equal to 30 wt % to less than or equal to 50 wt % silsesquioxane, or greater than or equal to 35 wt % to less than or equal to 45 wt % silsesquioxane, and all ranges and sub-ranges between the foregoing values.

The metal oxide particles may be added, in embodiments, to the UV blocking coating in an amount such that the metal oxides comprise from greater than or equal to 30 wt % to less than or equal to 90 wt % of the UV blocking coating and all ranges and sub-ranges between the foregoing values. In some embodiments, the metal oxides comprise from greater than or equal to 35 wt % to less than or equal to 90 wt % of the UV blocking coating, greater than or equal to 40 wt % to less than or equal to 90 wt % of the UV blocking coating, greater than or equal to 45 wt % to less than or equal to 90 wt % of the UV blocking coating, greater than or equal to 50 wt % to less than or equal to 90 wt % of the UV blocking coating, greater than or equal to 55 wt % to less than or equal to 90 wt % of the UV blocking coating, greater than or equal to 60 wt % to less than or equal to 90 wt % of the UV blocking coating, greater than or equal to 65 wt % to less than or equal to 90 wt % of the UV blocking coating, greater than or equal to 70 wt % to less than or equal to 90 wt % of the UV blocking coating, greater than or equal to 75 wt % to less than or equal to 90 wt % of the UV blocking coating, greater than or equal to 80 wt % to less than or equal to 90 wt % of the UV blocking coating, or greater than or equal to 85 wt % to less than or equal to 90 wt % of the UV blocking coating, and all ranges and sub-ranges between the foregoing values. In other embodiments, the metal oxides comprise from greater than or equal to 30 wt % to less than or equal to 85 wt % of the UV blocking coating, greater than or equal to 30 wt % to less than or equal to 80 wt % of the UV blocking coating, greater than or equal to 30 wt % to less than or equal to 75 wt % of the UV blocking coating, greater than or equal to 30 wt % to less than or equal to 70 wt % of the UV blocking coating, greater than or equal to 30 wt % to less than or equal to 65 wt % of the UV blocking coating, greater than or equal to 30 wt % to less than or equal to 60 wt % of the UV blocking coating, greater than or equal to 30 wt % to less than or equal to 55 wt % of the UV blocking coating, greater than or equal to 30 wt % to less than or equal to 50 wt % of the UV blocking coating, greater than or equal to 30 wt % to less than or equal to 45 wt % of the UV blocking coating, greater than or equal to 30 wt % to less than or equal to 40 wt % of the UV blocking coating, or greater than or equal to 30 wt % to less than or equal to 35 wt % of the UV blocking coating, and all ranges and sub-ranges between the foregoing values.

The UV blocking coating according to embodiments, blocks light at wavelengths less than or equal to 266 nm such that light at these wavelengths has a transmission of less than or equal to 5.0%, such as less than or equal to 4.5%, less than or equal to 4.0%, less than or equal to 3.5%, less than or equal to 3.0%, less than or equal to 2.5%, less than or equal to 2.0%, less than or equal to 1.5%, or less than or equal to 1.0% and all ranges and sub-ranges between the foregoing values. In some embodiments, the UV blocking coating blocks light at wavelengths less than or equal to 266 nm such that light at these wavelengths has a transmission of less than or equal to 0.9%, such as less than or equal to 0.8%, less than or equal to 0.7%, less than or equal to 0.6%, less than or equal to 0.5%, less than or equal to 0.4%, less than or equal to 0.2%, less than or equal to 0.1%, or even 0.0% and all ranges and sub-ranges between the foregoing values.

As noted above, the amount of metal oxide added to the aqueous formulation of the UV blocking coating affects the blocking of light, which in turn decreases the light transmission in the wavelengths that are blocked by that particular metal oxide. Accordingly, increasing the amount of metal oxides in the UV blocking coating will decrease the transmission of light at wavelengths less than or equal to 266 nm. However, as disclosed above, adding too high of an amount of metal oxides to the UV blocking coating may decrease the workability of the UV blocking coating. An additional way to decrease the transmission of light in the UV blocking coating without adding more metal oxides to the coating is to increase the thickness of the UV blocking coating applied to the substrate. As disclosed above, the UV blocking coating of embodiments may be used in a device comprising a lens assembly, such as a lithographic device. In such devices, each lens in the lens assembly is stabilized within the device using a potting material that is deposited on the lens and positioned between the lens and a housing of the device. In embodiments, the potting material may be photo or electron beam curable material component is a functionalized material selected from: polybutadiene, polyisoprene, polyethylene propylene rubber and combinations thereof, said material being completely hydrogenated or substantially completely hydrogenated and free or substantially free of carbon-carbon double and triple bonds. In some embodiments, the photo or electron beam curable material component is functionalized by at least one polymerizable terminal or pendant group selected from: acrylate, methacrylate, acrylamide, maleimide, thioacrylate, thiomethacrylate, vinyl sulfide, itaconate, crotonate, styrene and N-vinyl amide, hydroxyl, thiol, epoxy, oxetane, episulfide, vinyl ether, propenyl ether, allyl ether, and compatible mixtures and/or combinations thereof. In other embodiments, the photo or electron beam curable material component is functionalized by at least one polymerizable terminal or pendant group selected from acrylate, methacrylate and epoxy. Such potting materials are disclosed, for example, in U.S. Pat. No. 7,232,595, which is incorporated herein by reference in its entirety.

Figure 1:
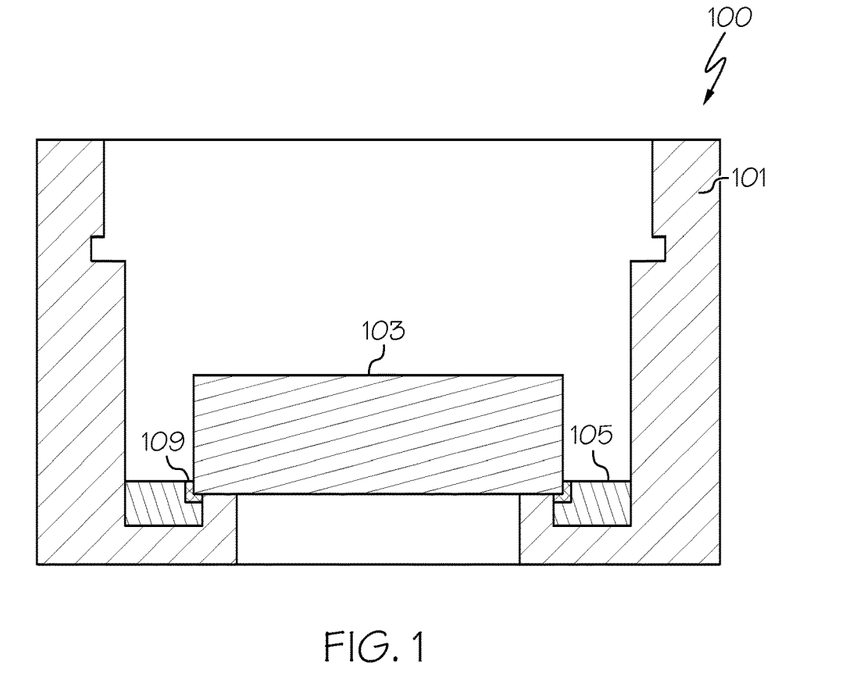
FIG. 1 schematically depicts a lens assembly of an optical device according to embodiments disclosed and described herein.
Figure 2:
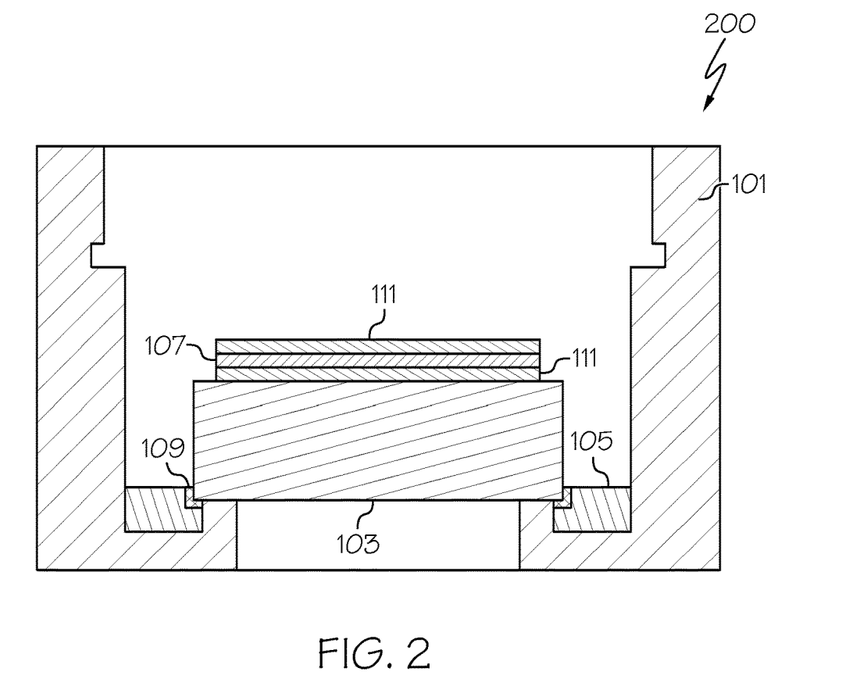
FIG. 2 schematically depicts a second lens assembly of an optical device according to embodiments disclosed and described herein.
Figure 3:
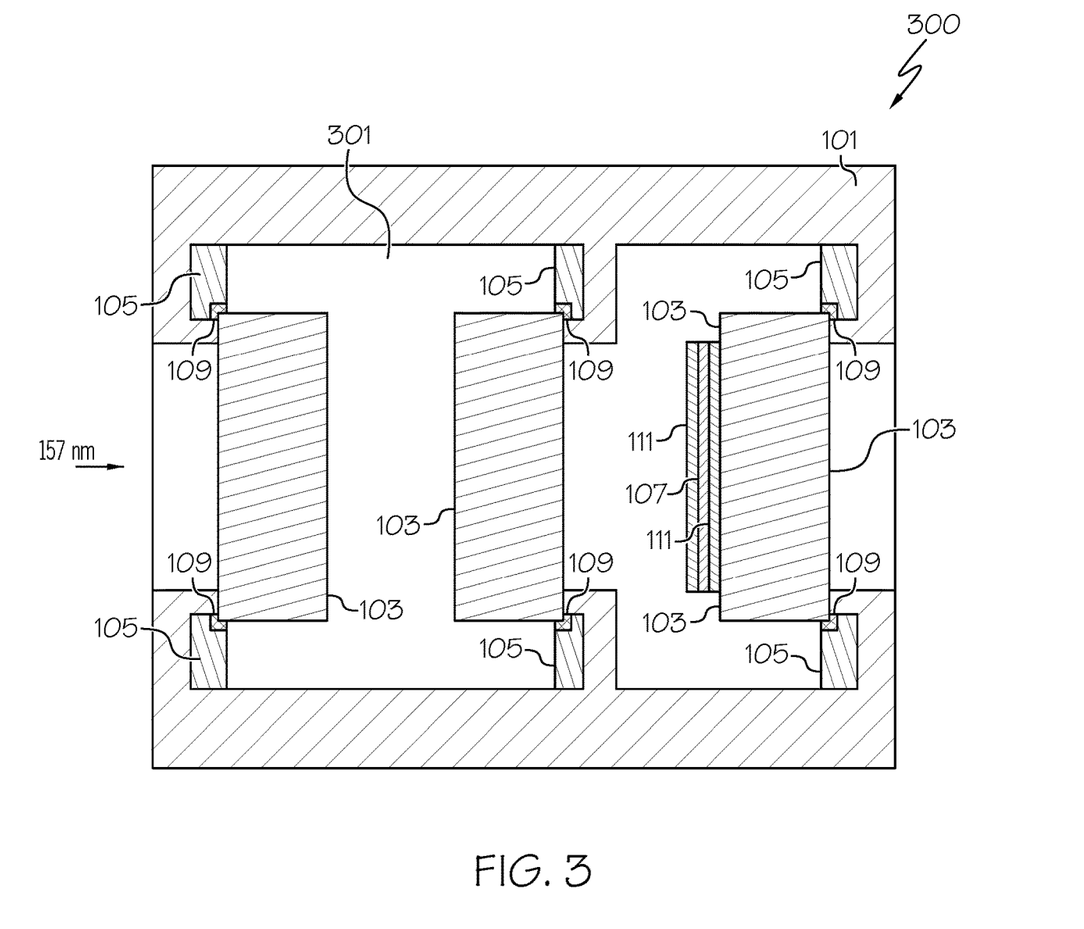
FIG. 3 schematically depicts a lens stack of an optical device according to embodiments disclosed and described herein.
Figure 4A:
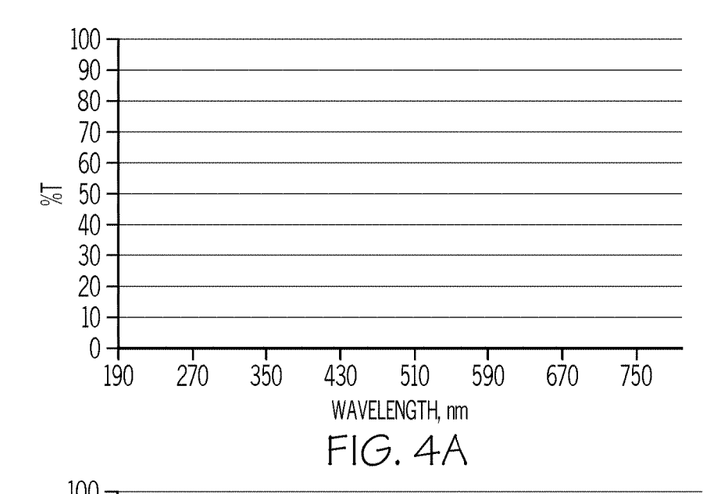
FIGS. 4A to 4D are graphs showing the transmission percentage of light having wavelengths from 190 nm to 800 nm through a UV blocking coating comprising CuO according to embodiments disclosed and described herein.
Figure 4B:
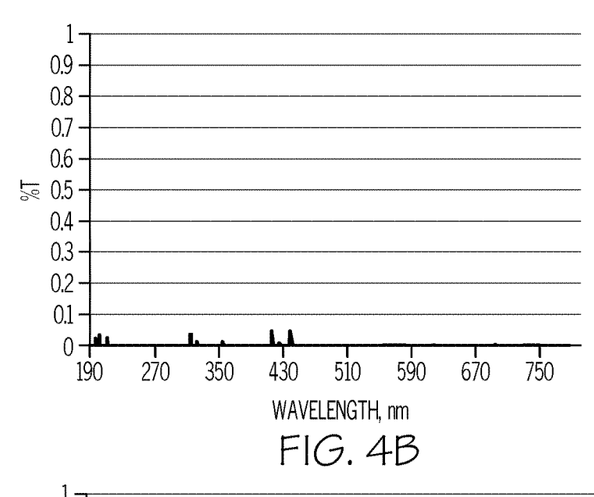
Figure 4C:
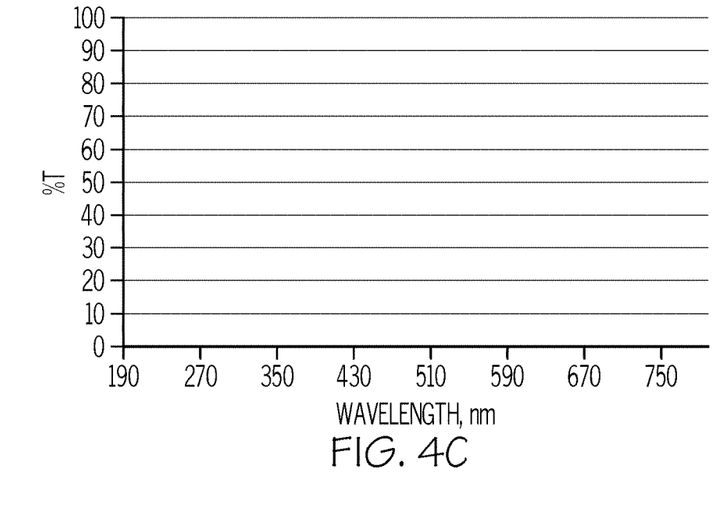
Figure 4D:
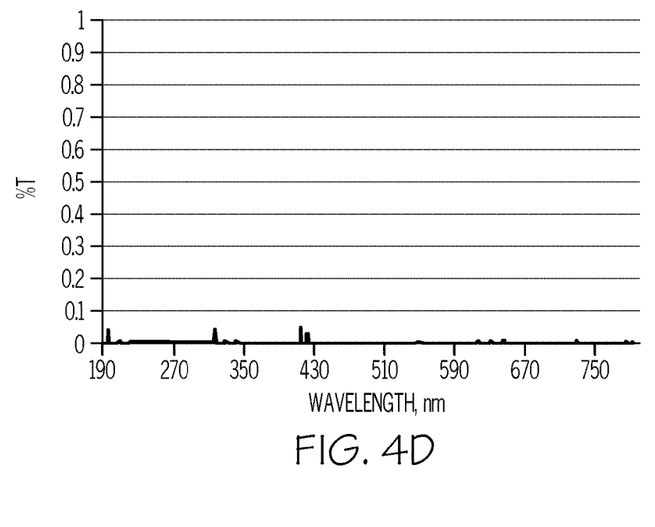
Figure 5A:
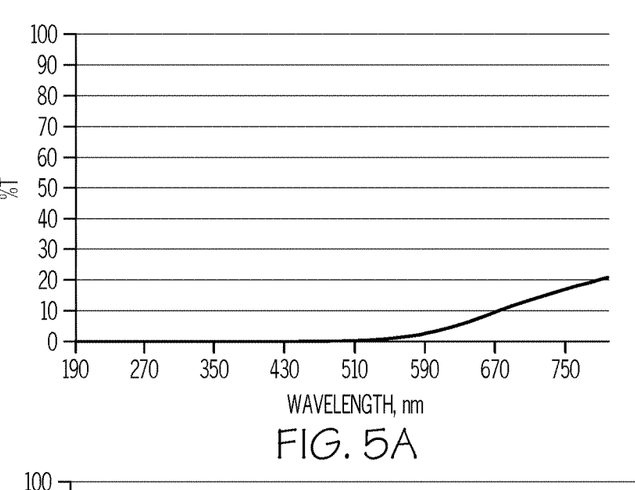
FIGS. 5A to 5D are graphs showing the transmission percentage of light having wavelengths from 190 nm to 800 nm through a UV blocking coating comprising $Fe_2O_3$ according to embodiments disclosed and described herein.
Figure 5B:
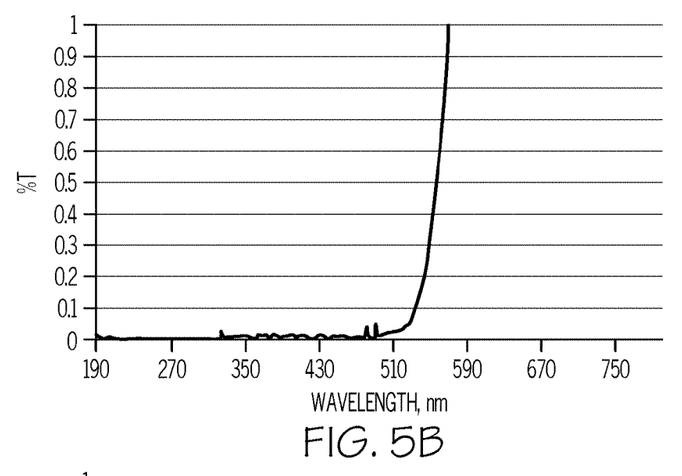
Figure 5C:
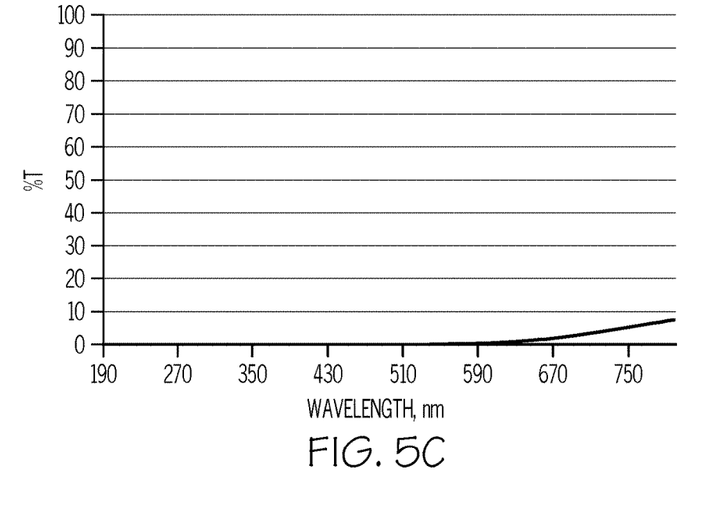
Figure 5D:
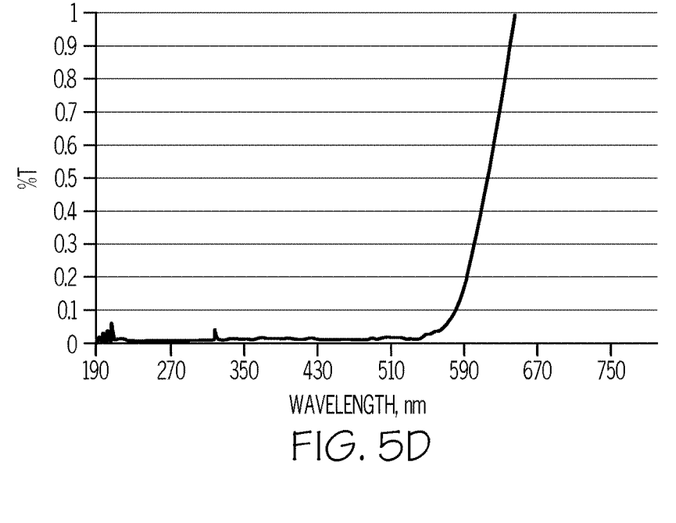
Figure 6A:
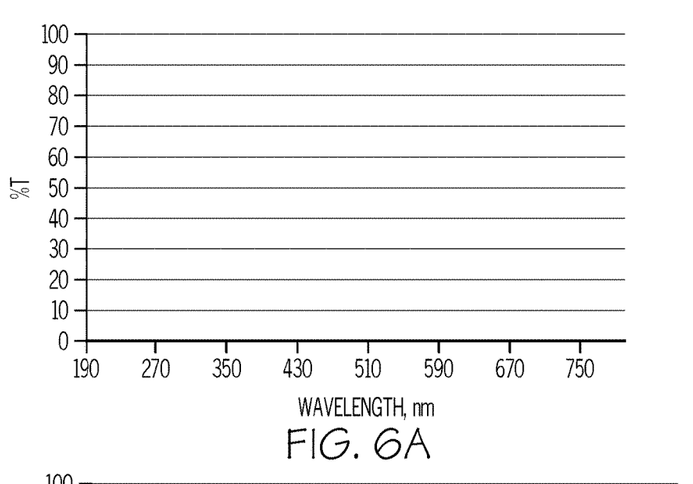
FIGS. 6A to 6D are graphs showing the transmission percentage of light having wavelengths from 190 nm to 800 nm through a UV blocking coating comprising $Mn_2O_3$ according to embodiments disclosed and described herein.
Figure 6B:
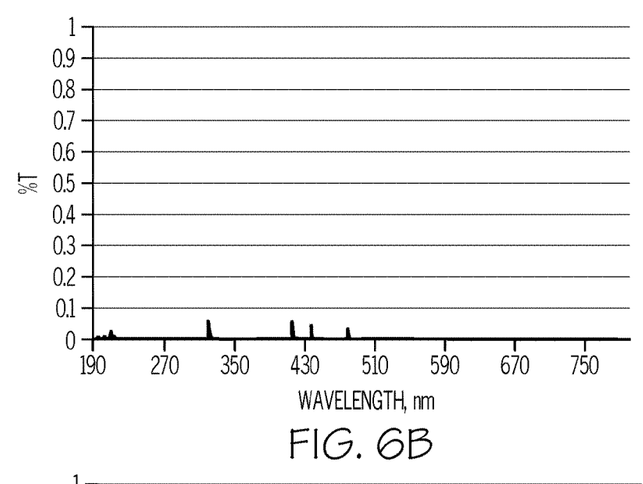
Figure 6C:
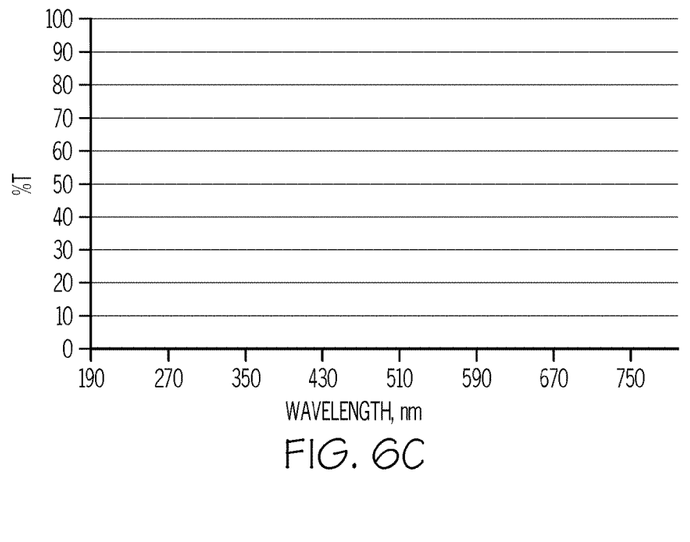
Figure 6D:
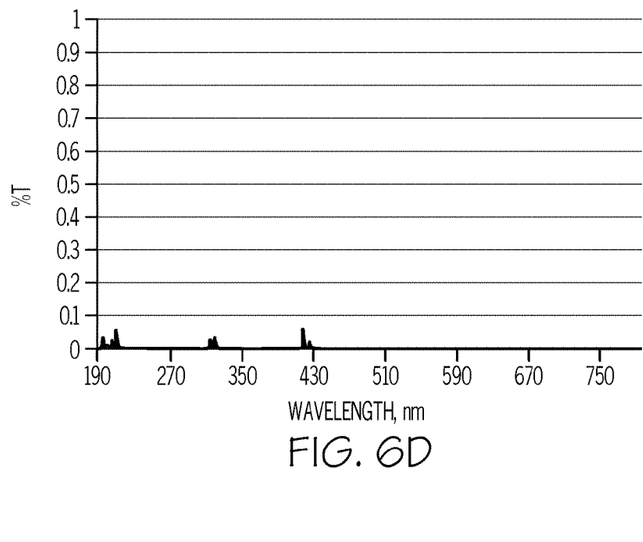
Figure 7A:
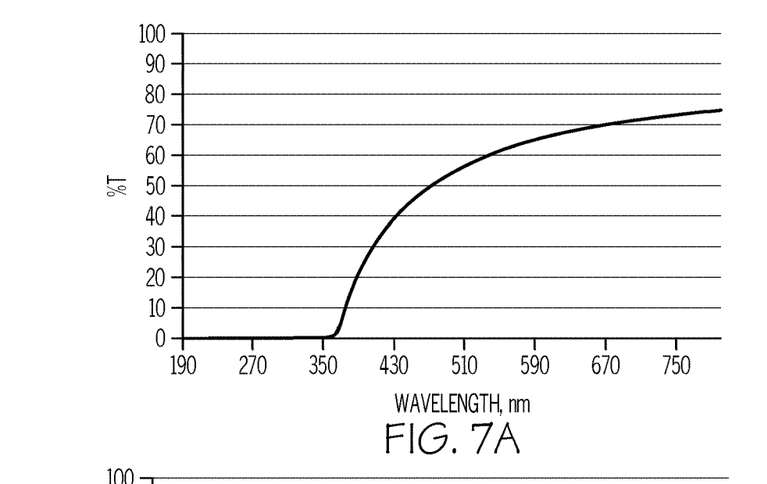
FIGS. 7A to 7D are graphs showing the transmission percentage of light having wavelengths from 190 nm to 800 nm through a UV blocking coating comprising $CeO_2$ according to embodiments disclosed and described herein.
Figure 7B:
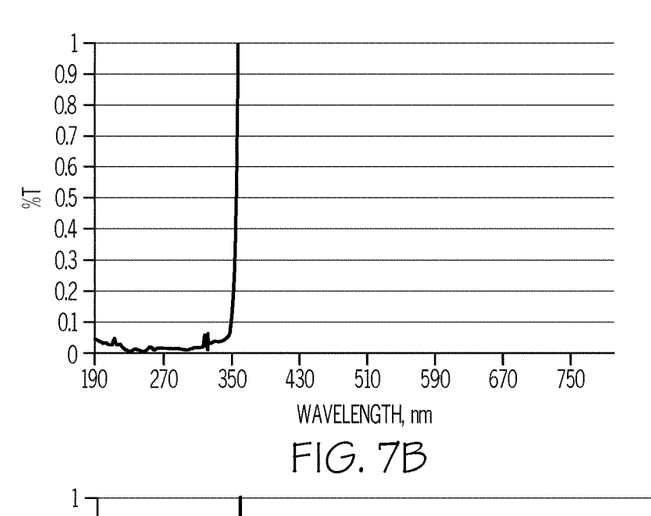
Figure 7C:
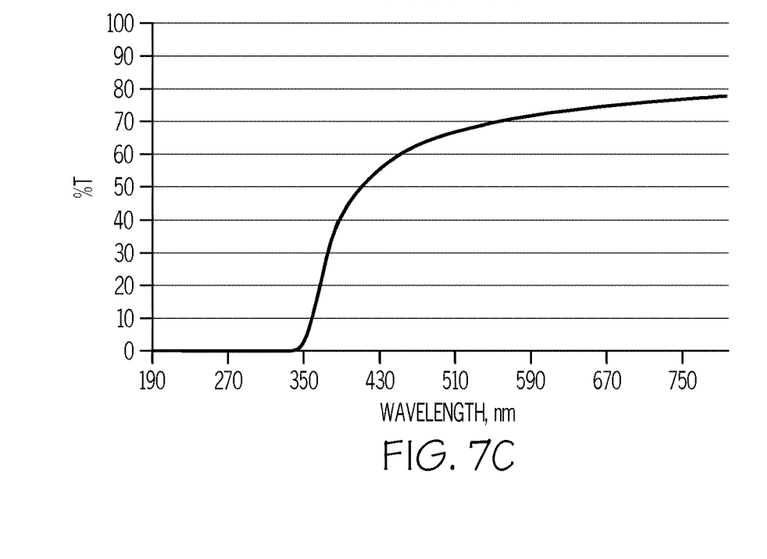
Figure 7D:
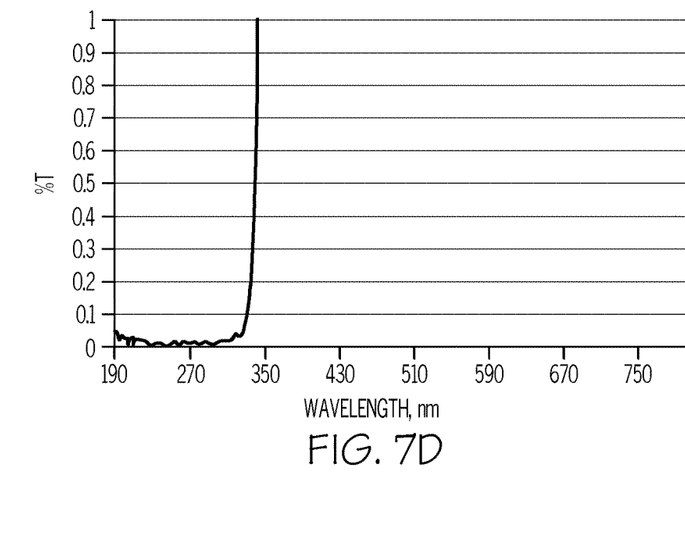
Figure 8A:
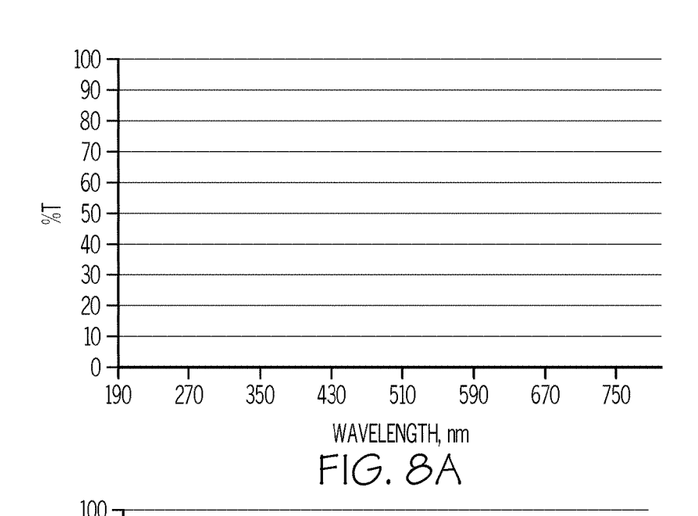
FIGS. 8A to 8D are graphs showing the transmission percentage of light having wavelengths from 190 nm to 800 nm through a UV blocking coating comprising NiO according to embodiments disclosed and described herein.
Figure 8B:
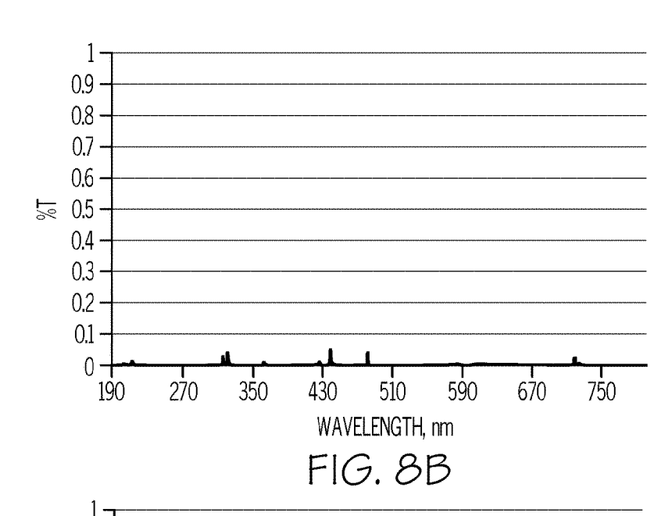
Figure 8C:
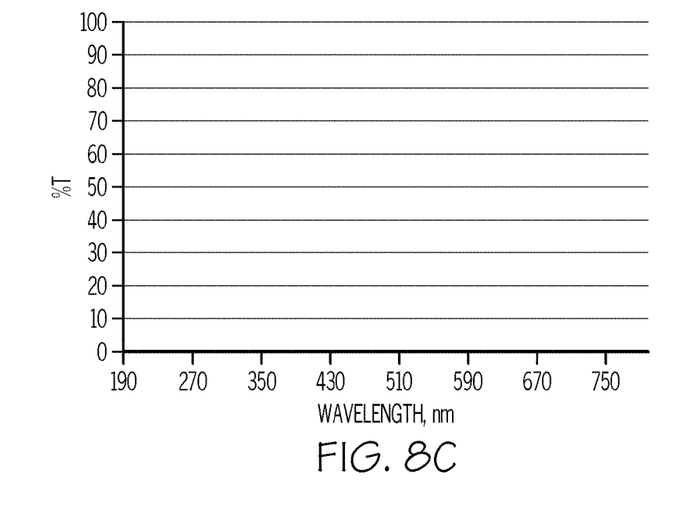
Figure 8D:
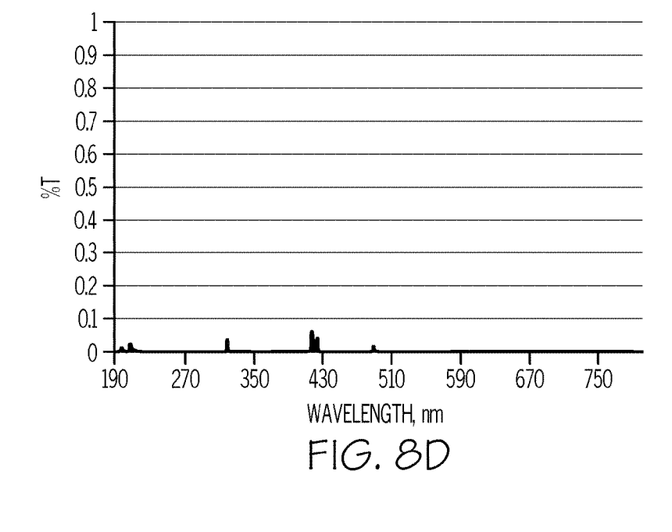
Figure 9A:
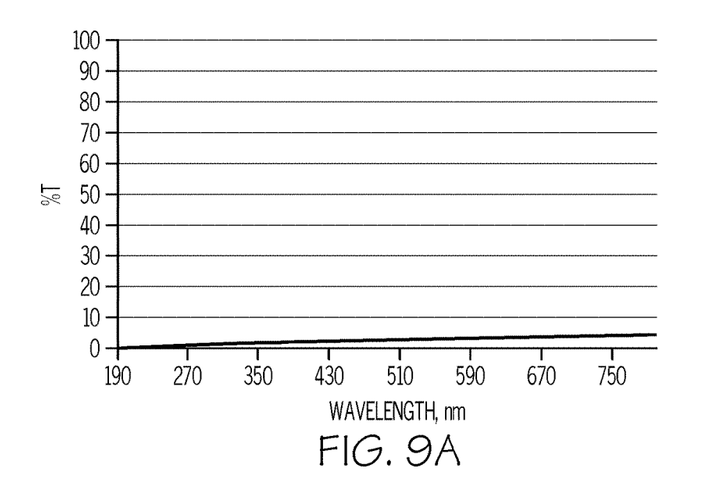
FIGS. 9A to 9D are graphs showing the transmission percentage of light having wavelengths from 190 nm to 800 nm through a UV blocking coating comprising $ZrO_2$ according to embodiments disclosed and described herein.
Figure 9B:
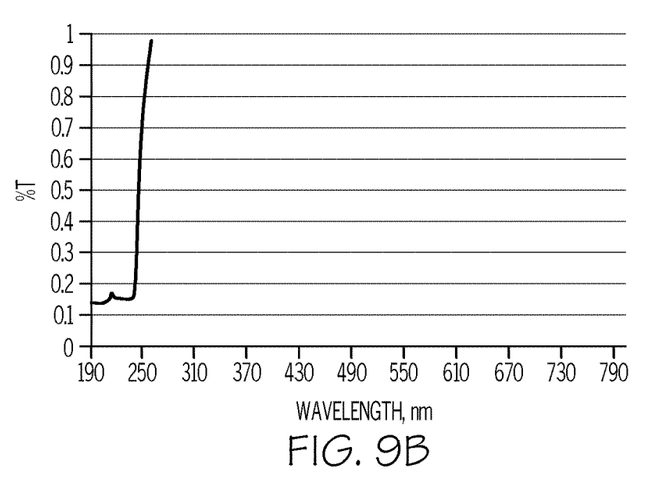
Figure 9C:
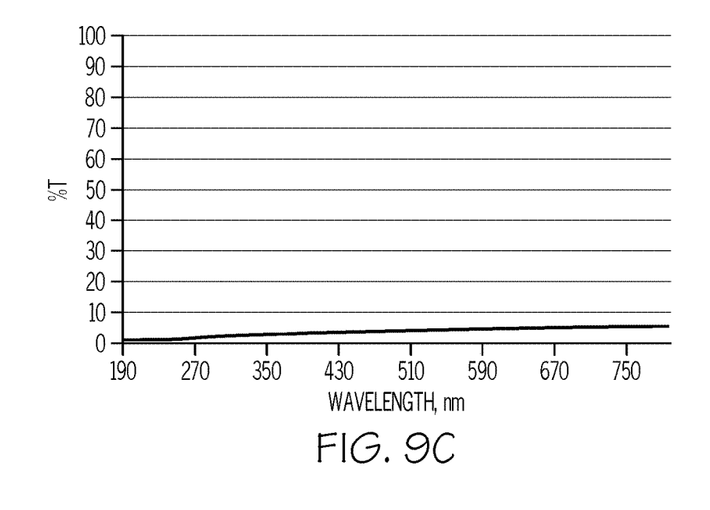
Figure 9D:
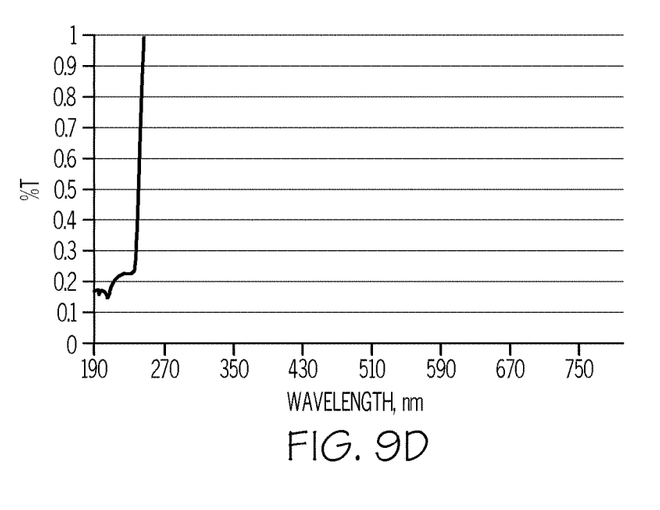
Figure 10A:
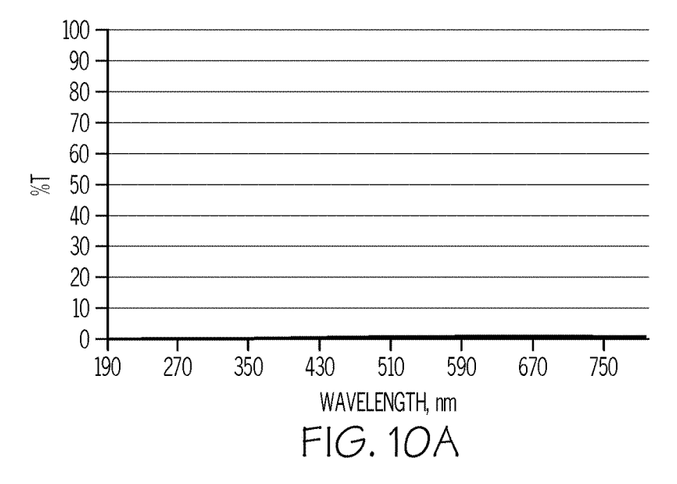
FIGS. 10A to 10D are graphs showing the transmission percentage of light having wavelengths from 190 nm to 800 nm through a UV blocking coating comprising $Nb_2O_3$ according to embodiments disclosed and described herein.
Figure 10B:
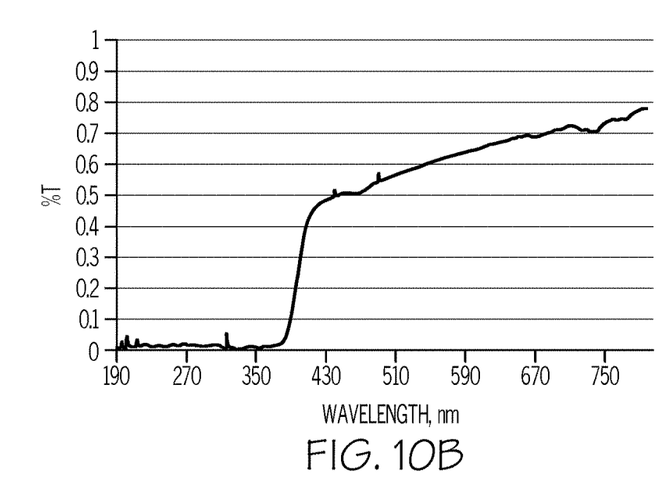
Figure 10C:
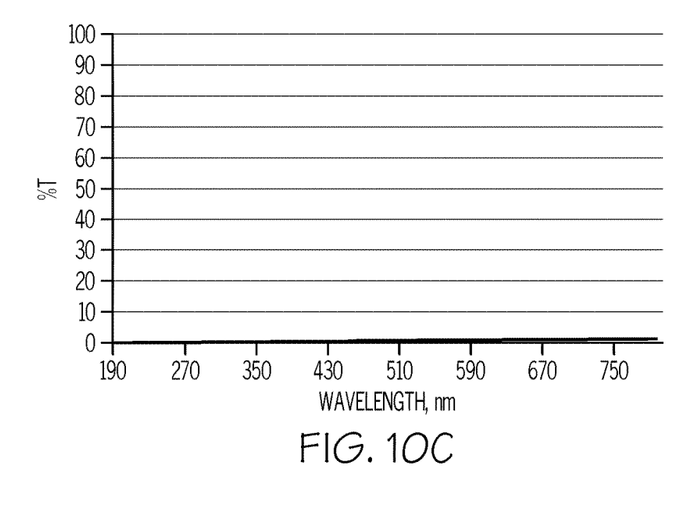
Figure 10D:
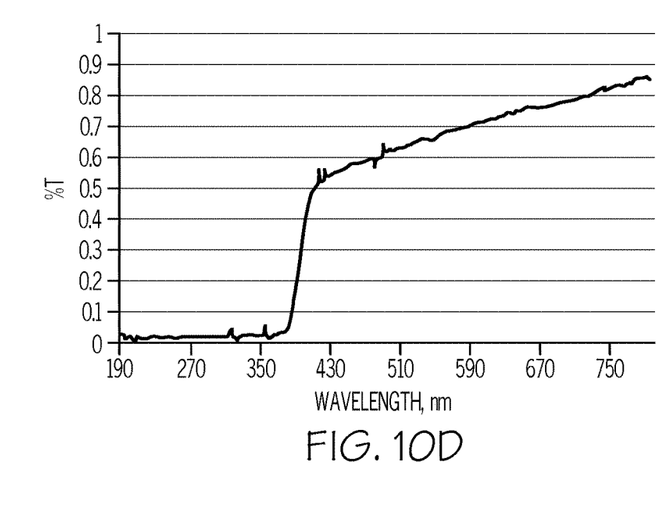
Figure 11A:
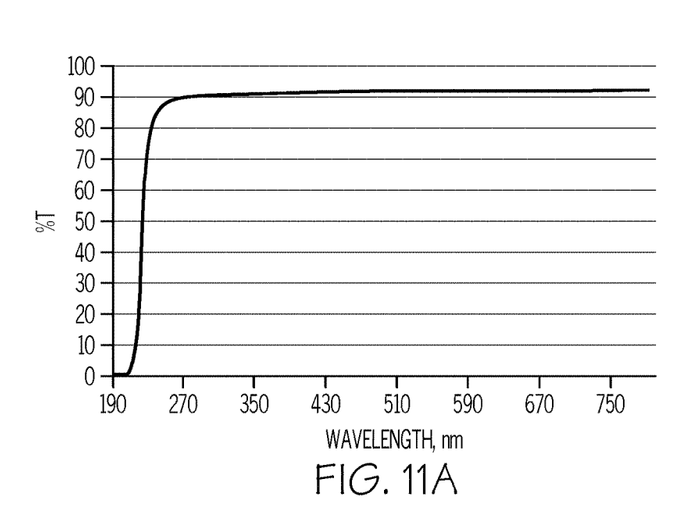
FIGS. 11A to 11D are graphs showing the transmission percentage of light having wavelengths from 190 nm to 800 nm through a UV blocking coating comprising aminopropylsilsesquioxane.
Figure 11B:
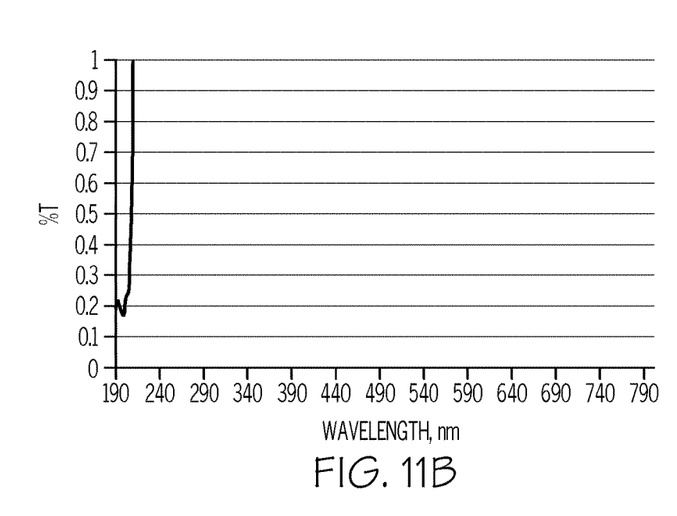
Figure 11C:
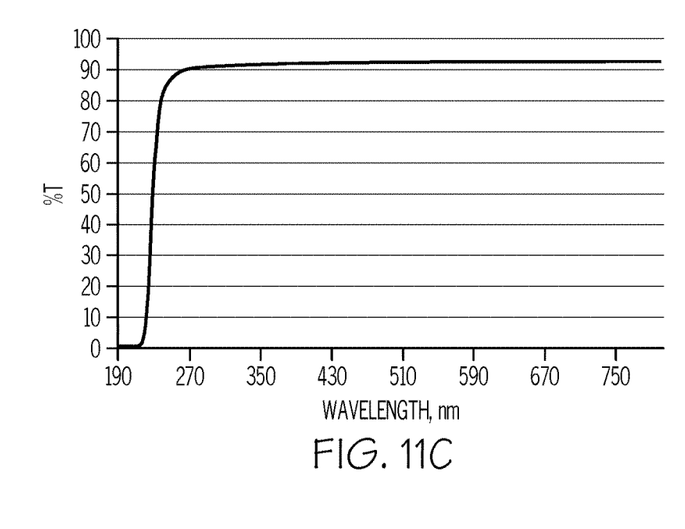
Figure 11D:
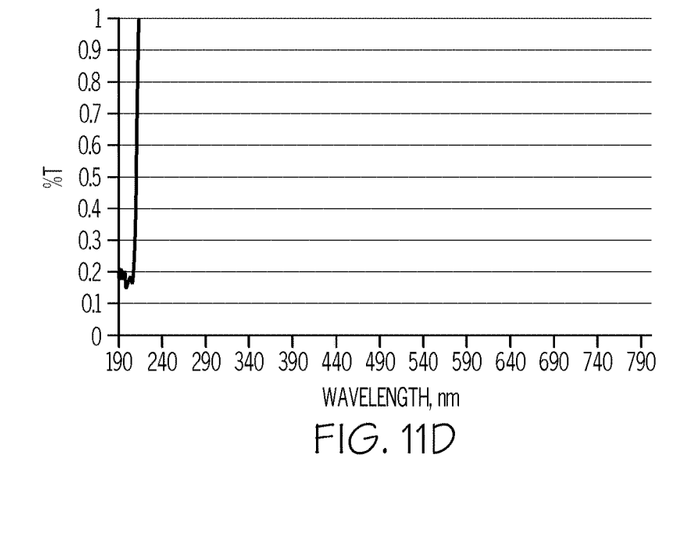

An exemplary lens assembly 100 is described now with reference to FIGS. 1-3. In FIG. 1, 101 is a stainless steel lens housing, 103 is a lens element, and 105 is a lens potting material. Many potting materials are commercially available, and are known to those skilled in the art. Between the lens element 103 and the potting material 105 is a thin layer of the UV blocking coating 109. Three lens elements potted in the same manner were stacked to form a lens assembly (as shown in FIG. 3). In some embodiments, the last lens element 200 in the stack has a layer of potting material 107 applied to the surface of the lens element, as shown in FIG. 2. In such embodiments, a layer of the UV blocking coating 111 may be applied between the lens element 103 and the potting material 107. The potting material layer 107 on the last element was applied to the element prior to potting. The three potted lens elements were then assembled in a stack 300 as depicted in FIG. 3. The direction of the light source (indicated by the arrow in FIG. 3) places the potting material layer 107 on the third lens element directly in the path of the light source. The light source comprises UV light and is transmitted into the lens elements 103, where a portion of the UV light is scattered and is transmitted to the potting material 105 and 107. In conventional lens assemblies, the UV light would cause the potting material 105 and 107 to degrade over time and with continued use. However, by positioning the UV blocking coating 109 and 111 of embodiments between the lens elements 103 and the potting material 105 and 107 and on the potting material 107, the UV blocking coating prevents most (i.e., greater than or equal to 95%, or even greater than or equal to 99%) of the UV light (e.g., light in one of the following ranges: 190 to 266 nm, and in some embodiments 190 nm to 350 nm, or 190 to 300 nm, or 190 nm o 270 nm, or 270 to 300 nm, or 170 nm to 300 nm) from contacting the potting material 105 and 107. In some embodiments ultraviolet light blocking coating has a transmission percentage of less than or equal to 1% for light having a wavelength less than or equal to 266 nm, e.g., in the range between 200 nm and 266 nm, or 190 nm to 266 nm, or 170 nm to 266 nm. Accordingly, the UV blocking coating 109 and 111 prolongs the useful life of the potting material 105 and 107 in the lens stack 300 or assembly 100.

In a first clause, an aqueous formulation of an ultraviolet light blocking coating comprises: from greater than or equal to 15 wt % to less than or equal to 65 wt % water; from greater than or equal to 30 wt % to less than or equal to 70 wt % metal oxide particles; and from greater than or equal to 5 wt % to less than or equal to 35 wt % aminoalkylsilsesquioxane oligomers.

A second clause comprises the aqueous formulation of the first clause, wherein the metal oxide particles are selected from the group consisting of copper oxide, iron oxide, manganese oxide, cerium oxide, nickel oxide, zirconium oxide, niobium oxide, and combinations thereof.

A third clause comprises the aqueous formulation of the first and second clause, wherein the aminoalkylsilsesquioxane is selected from the group consisting of aminomethylsilsesquioxane, aminoethylsilsesquioxane, aminopropylsilsesquioxane, aminobutylsilsesquioxane, and combinations thereof.

A fourth clause comprises the aqueous formulation of the first to third clause, wherein the aminoalkylsilsesquioxane is aminopropylsilsesquioxane.

A fifth clause comprises the aqueous formulation of the first to fourth clause, wherein the metal oxide particles have an average particle size from greater than or equal to 1.5 nm to less than or equal to 120 nm.

A sixth clause comprises the aqueous formulation of the first to fifth clause, wherein the aqueous formulation does not comprise an organic solvent.

A seventh clause comprises the aqueous formulation of the first to sixth clause, wherein the aqueous formulation comprises from greater than or equal to 40 wt % to less than or equal to 60 wt % metal oxide particles.

An eighth clause comprises the aqueous formulation of the first to seventh, wherein the aqueous formulation comprises from greater than or equal to 5 wt % to less than or equal to 20 wt % aminoalkylsilsesquioxane oligomers.

A ninth clause includes a method for preparing an ultraviolet light blocking coating, the method comprising: forming an aqueous formulation by mixing: from greater than or equal to 15 wt % to less than or equal to 65 wt % of water, greater than or equal to 30 wt % to less than or equal to 70 wt % metal oxide particles, and greater than or equal to 5 wt % to less than or equal to 35 wt % aminoalkylsilsesquioxane oligomers; applying the aqueous formulation to a substrate; and curing the aqueous formulation that has been applied to the substrate.

A tenth clause comprises the method of the ninth clause, wherein the coating solution is cured at a temperature from greater than or equal to 100° C. to less than or equal to 150° C.

An eleventh clause comprises the method of the ninth and tenth clauses, wherein the coating solution is cured at a temperature from greater than or equal to 100° C. to less than or equal to 125° C.

A twelfth clause comprises the method of the ninth to eleventh clause, wherein the metal oxide particles are selected form the group consisting of copper oxide, iron oxide, manganese oxide, cerium oxide, nickel oxide, zirconium oxide, niobium oxide, and combinations thereof.

A thirteenth clause comprises the method of the ninth to twelfth clause, wherein the aminoalkylsilsesquioxane is selected from the group consisting of aminomethylsilsesquioxane, aminoethylsilsesquioxane, aminopropylsilsesquioxane, aminobutylsilsesquioxane, and combinations thereof.

A fourteenth clause comprises the method of the ninth to thirteenth clause, wherein the aminoalkylsilsesquioxane is aminopropylsilsesquioxane.

A fifteenth clause includes an optical device comprising: a housing; at least one lens element positioned within the housing; potting material positioned between at least a portion of the at least one lens element and the housing; and an ultraviolet light blocking coating positioned between the at least one lens element and the potting material, wherein the ultraviolet light blocking coating comprises from greater than or equal to 30 wt % to less than or equal to 90 wt % metal oxide particles and from greater than or equal to 10 wt % to less than or equal to 70 wt % silsesquioxane.

A sixteenth clause comprises the optical device of the fifteenth clause, wherein the metal oxide particles are selected form the group consisting of copper oxide, iron oxide, manganese oxide, cerium oxide, nickel oxide, zirconium oxide, niobium oxide, and combinations thereof.

A seventeenth clause comprises the optical device of the fifteenth to sixteenth clause, wherein ultraviolet light blocking coating comprises from greater than or equal to 10 wt % to less than or equal to 25 wt % silsesquioxane.

An eighteenth clause comprises the optical device of the fifteenth to seventeenth, wherein ultraviolet light blocking coating comprises from greater than or equal to 40 wt % to less than or equal to 60 wt % metal oxide particles.

A nineteenth clause comprises the optical device of the fifteenth to eighteenth clause, wherein ultraviolet light blocking coating has a transmission percentage of less than or equal to 5% for light having a wavelength less than or equal to 266 nm.

A twentieth clause comprises the optical device of the fifteenth to nineteenth clause, wherein ultraviolet light blocking coating has a transmission percentage of less than or equal to 1% for light having a wavelength less than or equal to 266 nm.

EXAMPLES

Embodiments will be further clarified by the following examples.

Coating formulations were fabricated by mixing an aqueous mixture comprising aminopropylsilsesquioxane oligomers and water with particles of various metal oxides as shown in TABLE 1 below.

TABLE 1

| Sample No. | Metal Oxide | Particle Size (nm) | Appearance |
|---|---|---|---|
| 1 | CuO | <50 nm | Black |
| 2 | $Fe_2O_3$ | <50 nm | Red/orange |
| 3 | $Mn_2O_3$ | ~325 mesh | Black |
| 4 | $CeO_2$ | <25 nm | Yellowish, translucent |
| 5 | NiO | <50 nm | Gray/black |
| 6 | $ZrO_2$ | <100 nm | White |
| 7 | $Nb_2O_3$ | ~325 mesh | White |
| 8 | None | N/A | Transparent/colorless |

To prepare Samples 1-7 aminopropylsilsesquioxane (20 wt % solution in water) manufactured by Gelest (Cat No WSA-9911) was mixed with metal oxide particles procured from Aldrich as follows: CuO (Cat. No 544868), $Fe_2O_3$ (Cat. No 544884), $Mn_2O_3$ (Cat. No 377457), $CeO_2$ (Cat. No 544841), NiO (Cat. No 637130), $ZrO_2$ (Cat. No 544760), and $Nb_2O_3$ (Cat. No 208515). The aqueous aminopropylsilsesquioxane was mixed with the metal oxide particles so that the mixture comprised 50 wt % aqueous aminopropylsilsesquioxane and 50 wt % metal oxide particles. A few milliliters of WSA-9911 were transferred using a pipette to a 20 mL glass vial, then dry metal oxide particles were added to the liquid and mixed using a stainless steel spatula until homogeneous mixture is achieved. Sample 8 was aqueous aminopropylsilsesquioxane without any metal oxide particles mixed in.

Each of the sample formulations were applied by a brush on 2"×1" high purity fused silica (HPFS) slides procured from AdValue Technology. The samples were then subsequently dried at ambient temperature and then cured at 150° C. for 15 min using a PF30 convection oven (Carbolite). Two slides were prepared for each of the 8 samples (totaling 16 slides).

FIGS. 4A-11D show the percentage of light transmission (% T) for each of Samples 1-8, with two test conducted per sample. The % T at wavelengths from 170 nm to 800 nm for each of the coated samples was measured using a Genesys 10S UV-Vis spectrophotometer manufactured by Thermo-Fisher Scientific.

The coatings were formulated using the metal oxide particles listed in TABLE 1. The light transmission data for control Sample 8, which is the aminopropylsilsesquioxane film without any particles added, is shown in FIGS. 11A-11D. The light transmittance for the aminopropylsilsesquioxane film (Sample 8; FIGS. 11A-11D) decreases sharply at about 240 nm and drops further to 0.2% at about 210 nm. This light absorbance is due to remnants of the aminopropyl group in the material, which will gradually oxidize and decompose upon UV exposure generating non condensable by-products while leaving the Si—O—Si network of silsesquioxane intact. Thus, any absorbance above 210 nm for coatings containing metal oxide particles is due to the metal oxide particles and not attributable to the aminopropylsilsesquioxane. Accordingly, black metal oxide particles, such as CuO of Sample 1, $Mn_2O_3$ of Sample 3, and NiO of Sample 5, show complete light blockage in the entire range of measured wavelengths (i.e., 170 nm to 800 nm), as shown in FIGS. 4A-4D, 6A-6D, and 8A-8D, respectively. The coatings containing $Fe_2O_3$ particles, Sample 2, show complete light absorption at wavelengths up to about 500 nm, as shown in FIGS. 5A-5D. The coatings with $CeO_2$, Sample 4, and $Nb_2O_3$, Sample 7, blocked light up to about 350 nm and about 370 nm, respectively, as shown FIGS. 7A-7D and 10A-10D, respectively. The coating with $ZrO_2$ particles, Sample 6, showed a dramatic reduction in light transmittance to single digits, as shown in FIGS. 9A-9D, and demonstrated a % T below 1% for wavelengths below 250 nm.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An aqueous formulation of an ultraviolet light blocking coating, the aqueous formulation comprising:
    from greater than or equal to 15 wt % to less than or equal to 65 wt % water;
    from greater than or equal to 30 wt % to less than or equal to 70 wt % metal oxide particles; and
    from greater than or equal to 5 wt % to less than or equal to 35 wt % aminoalkylsilsesquioxane oligomers.

2. The aqueous formulation of claim 1, wherein the metal oxide particles are selected from the group consisting of copper oxide, iron oxide, manganese oxide, cerium oxide, nickel oxide, niobium oxide, and combinations thereof.

3. The aqueous formulation of claim 1, wherein the aminoalkylsilsesquioxane is selected from the group consisting of aminomethylsilsesquioxane, aminoethylsilsesquioxane, aminopropylsilsesquioxane, aminobutylsilsesquioxane, and combinations thereof.

4. The aqueous formulation of claim 1, wherein the aminoalkylsilsesquioxane is aminopropylsilsesquioxane.

5. The aqueous formulation of claim 1, wherein the metal oxide particles have an average particle size from greater than or equal to 1.5 nm to less than or equal to 120 nm.

6. The aqueous formulation of claim 1, wherein the aqueous formulation does not comprise an organic solvent.

7. The aqueous formulation of claim 1, wherein the aqueous formulation comprises from greater than or equal to 40 wt % to less than or equal to 60 wt % metal oxide particles.

8. The aqueous formulation of claim 1, wherein the aqueous formulation comprises from greater than or equal to 5 wt % to less than or equal to 20 wt % aminoalkylsilsesquioxane oligomers.

9. A method for preparing an ultraviolet light blocking coating, the method comprising:
    forming an aqueous formulation by mixing:
        from greater than or equal to 15 wt % to less than or equal to 65 wt % of water, greater than or equal to 30 wt % to less than or equal to 70 wt % metal oxide particles, and
greater than or equal to 5 wt % to less than or equal to 35 wt %
aminoalkylsilsesquioxane oligomers;
applying the aqueous formulation to a substrate; and
curing the aqueous formulation that has been applied to the substrate, wherein the substrate comprises glass or high purity fused silica.

10. The method of claim 9, wherein the aqueous formulation is cured at a temperature between 100° C. and 150° C.

11. The method of claim 9, wherein the aqueous formulation is cured at a temperature between 100° C. and 125° C.

12. The method of claim 9, wherein the metal oxide particles are selected from the group consisting of copper oxide, iron oxide, manganese oxide, cerium oxide, nickel oxide, zirconium oxide, niobium oxide, and combinations thereof.

13. The method of claim 9, wherein the aminoalkylsilsesquioxane is selected from the group consisting of aminomethylsilsesquioxane, aminoethylsilsesquioxane, aminopropylsilsesquioxane, aminobutylsilsesquioxane, and combinations thereof.

14. The method of claim 9, wherein the aminoalkylsilsesquioxane is aminopropylsilsesquioxane.

15. An optical device comprising:
a housing;
at least one lens element positioned within the housing;
a potting material positioned between at least a portion of the at least one lens element and the housing; and
an ultraviolet light blocking coating positioned between the at least one lens element and the potting material,
wherein the ultraviolet light blocking coating comprises from greater than or equal to 30 wt % to less than or equal to 90 wt % metal oxide particles and from greater than or equal to 10 wt % to less than or equal to 70 wt % silsesquioxane.

16. The optical device of claim 15, wherein the metal oxide particles are selected from the group consisting of copper oxide, iron oxide, manganese oxide, cerium oxide, nickel oxide, zirconium oxide, niobium oxide, and combinations thereof.

17. The optical device of claim 15, wherein ultraviolet light blocking coating comprises from greater than or equal to 10 wt % to less than or equal to 25 wt % silsesquioxane.

18. The optical device of claim 15, wherein ultraviolet light blocking coating comprises from greater than or equal to 40 wt % to less than or equal to 60 wt % metal oxide particles.

19. The optical device of claim 15, wherein ultraviolet light blocking coating has a transmission percentage of less than or equal to 5% for light having a wavelength less than or equal to 266 nm.

20. The optical device of claim 15, wherein ultraviolet light blocking coating has a transmission percentage of less than or equal to 1% for light having a wavelength less than or equal to 266 nm.

* * * * *

UNITED STATES PATENT AND TRADEMARK OFFICE
CERTIFICATE OF CORRECTION

PATENT NO. : 10,752,790 B2
APPLICATION NO. : 15/834802
DATED : August 25, 2020
INVENTOR(S) : Andrei Gennadyevich Fadeev It is certified that error appears in the above-identified patent and that said Letters Patent is hereby corrected as shown below:

On the Title Page

In Column 2, item (56), Other Publications, Line 2, delete "Nanoptticles";" and insert
-- Nanoparticles"; --, therefor.

Signed and Sealed this
Twelfth Day of November, 2024

Katherine Kelly Vidal
*Director of the United States Patent and Trademark Office*